(12) United States Patent
Kim et al.

(10) Patent No.: US 8,158,040 B2
(45) Date of Patent: Apr. 17, 2012

(54) METHOD FOR FABRICATING AN OPTICAL SHEET

(75) Inventors: Dong Hoon Kim, Seoul (KR); Jin Sung Choi, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 11/933,288

(22) Filed: Oct. 31, 2007

(65) Prior Publication Data

US 2008/0137367 A1 Jun. 12, 2008

(30) Foreign Application Priority Data

Dec. 12, 2006 (KR) .................. 10-2006-0126026

(51) Int. Cl.
*B29D 11/00* (2006.01)

(52) U.S. Cl. ............ 264/2.5; 264/1.1; 264/2.7; 264/219

(58) Field of Classification Search .................... 264/1.1, 264/1.7, 1.9, 2.5, 2.7, 219; 425/808
See application file for complete search history.

(56) References Cited

U.S. PATENT DOCUMENTS

| | | | | |
|---|---|---|---|---|
| 6,770,225 | B2 * | 8/2004 | Nilsen et al. .................. 264/1.9 |
| 2006/0238875 | A1 | 10/2006 | Hwang et al. | |
| 2006/0249863 | A1 | 11/2006 | Chuang | |
| 2007/0010594 | A1 * | 1/2007 | Wang et al. .................... 522/182 |
| 2007/0279940 | A1 | 12/2007 | Kim et al. | |

FOREIGN PATENT DOCUMENTS

| | | |
|---|---|---|
| JP | 55038508 | 3/1980 |
| JP | 08220344 | 8/1996 |
| JP | 2003-337331 | 11/2003 |
| JP | 2006-178240 | 7/2006 |
| KR | 10-2004-0020976 | 3/2004 |
| KR | 10-0432438 | 5/2004 |
| KR | 20-0361392 | 8/2004 |
| KR | 10-2006-0020226 | 3/2006 |
| WO | 0016132 | 3/2000 |
| WO | 2005119351 | 12/2005 |

OTHER PUBLICATIONS

European Search Report dated Mar. 20, 2008.

* cited by examiner

*Primary Examiner* — Mathieu D. Vargot
(74) *Attorney, Agent, or Firm* — H.C. Park & Associates, PLC (57) ABSTRACT

An optical sheet and a method for fabricating the optical sheet, wherein a diffusion pattern is formed to diffuse and condense light. The optical sheet includes a prism pattern having a plurality of mountains and ravines to condense light generated from a light source and a plurality of diffusion patterns irregularly formed on the prism pattern to diffuse the light.

12 Claims, 10 Drawing Sheets

METHOD FOR FABRICATING AN OPTICAL SHEET

CROSS REFERENCE TO RELATED APPLICATION

This application claims priority from and the benefit of Korean Patent Application No. 10-2006-0126026, filed on Dec. 12, 2006, which is hereby incorporated by reference for all purposes as if fully set forth herein.

BACKGROUND OF THE INVENTION

1. Field of the Invention

The present invention relates to a prism sheet, and more particularly to, a prism sheet having diffusing and condensing functions that may prevent a moiré phenomenon and a method for fabricating the same.

2. Discussion of the Background

Liquid crystal display ("LCD") devices are widely used in various industrial fields because they are generally lightweight and compact and require low power consumption. Such an LCD device includes a liquid crystal (LC) panel in which liquid crystal cells are arranged in a matrix between two transparent substrates, a driving circuit to drive the LC panel, and a backlight unit to supply light to the LC panel.

The backlight unit includes a lamp to generate light, a housing surrounding the lamp, a light guide plate to guide light emitted from the lamp toward the LC panel, a reflector sheet arranged below the light guide plate, and a plurality of optical sheets stacked above the light guide plate.

The optical sheets include a diffuser sheet, a prism sheet, and a protector sheet stacked sequentially above the light guide plate. Here, two or more diffuser sheets and two or more prism sheets may be arranged according to a desired product characteristic. Multiple diffuser sheets result in a thicker backlight unit. The prism sheet may have a prism pattern in which a mountain and a ravine are formed in turn. However, if the pitch of the prism mountain and the pixel pitch of the LC panel overlap, a moiré phenomenon, which is wave-like pattern interference, may occur.

SUMMARY OF INVENTION

The present invention provides an optical sheet having a diffusion pattern to diffuse and condense light, which may prevent a moiré phenomenon and a method for fabricating the same.

Additional features of the invention will be set forth in the description which follows, and in part will be apparent from the description or may be learned by practice of the invention.

The present invention discloses an optical sheet including a prism pattern having a plurality of mountains and ravines to condense light generated from a light source and a plurality of diffusion patterns irregularly formed on the prism pattern to diffuse the light.

The present invention also discloses a method for fabricating an optical sheet including preparing a sub master by forming a prism pattern having a plurality of mountains and ravines in turn and forming irregular diffusion patterns on sides of the mountains. A main master having mountains, ravines, and irregular diffusion patterns corresponding to the mountains and ravines and irregular diffusion patterns of the sub master is formed, and a film is pressurized using the main master to form an optical sheet.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments ser forth herein. Rather, these embodiments are provided so that this disclosure is thorough, and will fully convey the scope of the invention to those skilled in the art. In the drawings, the size and relative size of layers and regions may be exaggerated for clarity. Like reference numerals in the drawings denote like elements.

It will be understood that when an element such as a layer, film, region or substrate is referred to as being "on", "connected to", or "coupled to" another element or layer, it can be directly on, directly connected to, or directly coupled to the other element or layer, or intervening elements or layers may also be present. In contrast, when an element is referred to as being "directly on", "directly connected to", or "directly coupled to" another element or layer, there are no intervening elements or layers present.

Figure 1:
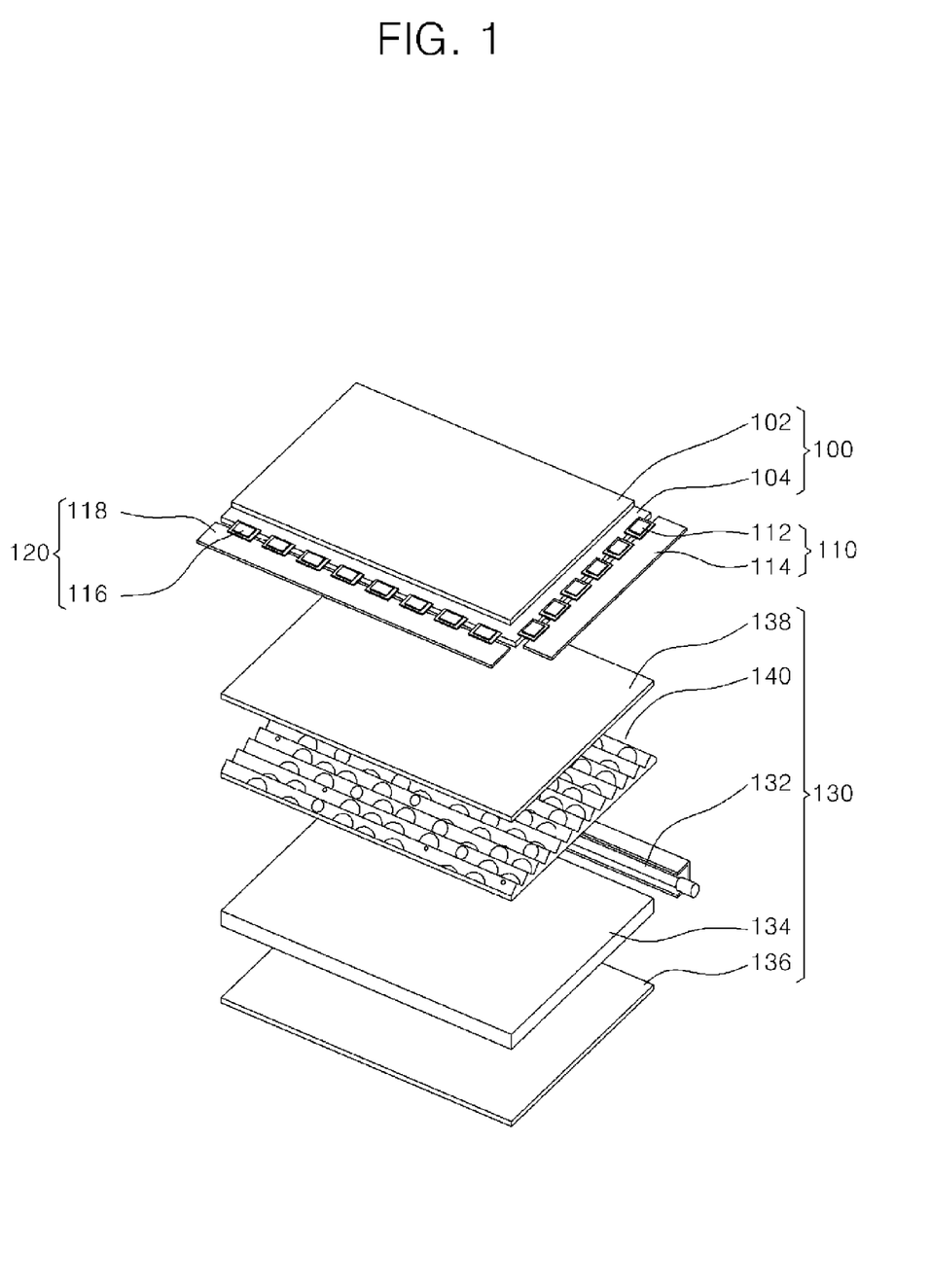
FIG. 1 is a perspective view showing an LCD device that includes a prism sheet according to an exemplary embodiment of the present invention.

FIG. 1 is a perspective view showing an LCD device that includes a prism sheet according to an exemplary embodiment of the present invention. The LCD device of FIG. 1 includes an LC panel 100, panel driving portions 110 and 120, and a backlight unit 130.

The LC panel 100 includes a color filter array substrate 102 and a thin film transistor ("TFT") array substrate 104 with a liquid crystal layer to adjust the transmittance of light interposed therebetween. The color filter array substrate 102 may include a black matrix to prevent light leakage, a color filter to realize a color image, a common electrode to form a vertical electric field together with a pixel electrode, and an upper alignment layer coated thereon to align the liquid crystal molecules. The TFT array substrate 104 includes gate lines and data lines arranged to cross each other, TFTs formed at crossing points of the gate lines and data lines, a pixel electrode connected to the TFTs, and a lower alignment layer coated thereon to align liquid crystal molecules.

The panel driving portions 110 and 120 include a gate driving portion to drive the gate lines of the LC panel 100 and a data driving portion 120 to drive the data lines.

The gate driving portion 110 includes a gate PCB (Printed Circuit Board) 114, a gate TCP (Tape Carrier Package) arranged between the gate PCB 114 and the TFT array substrate 104, and a gate IC (Integrated Circuit) 112 mounted on the gate TCP. The gate IC 112 may sequentially supply the gate lines with a scan signal of a high gate voltage. The Gate IC 112 may supply the gate lines with a low gate voltage during the remaining time (i.e. except during a time when the high gate voltage is supplied). The gate PCB 114 may supply the gate IC 112 with a control signal and a power signal from a timing control portion and a power portion mounted on a data PCB 118.

The data driving portion 120 may include a data PCB 118 and a data IC 116 mounted on a data TCP arranged between the data PCB 118 and the TFT array substrate 104. The data IC 116 may convert pixel data into analog pixel signals and supply the data lines with the analog pixel signals. The data PCB 118 may supply the data IC 116 with a control signal, a power signal, and the pixel data from the timing control portion and the power portion.

The backlight unit 130 may be arranged below the LC panel 100 and supplies light to the LC panel 100. To this end, the backlight unit 130 may include a light source 132, a light guide plate 134, a prism sheet 140, a protector sheet 138, and a reflector sheet 136.

A lamp or a light emitting diode may be arranged on one side of the light guide plate 134 as the light source 132.

The light guide plate 134 guides light emitted from the light source 132 to the LC panel 100. To this end, the light guide plate 134 may have an uneven surface, a concave-convex form, or a dot form so that light can be easily refracted and dispersed toward the LC panel 100. The light guide plate 134 may be made of poly methyl meta acrylate (PMMA), which is not easily transformed or broken and has high transmittance.

The reflector sheet 136 may be arranged below or beneath the light guide plate 134 and may reflect light emitted through a bottom surface of the light guide plate 134 from the light source 132 toward the LC panel 100. The reflector sheet 136 may include a reflective member having high reflectivity coated on a base material. For example, stainless steel, brass, aluminum (Al), polyethylene, or polyethylene terephthalate (PET) may be used as the base material, and silver (Ag) or titanium (Ti) may be used as the reflective member.

The prism sheet 140 may be located above or on the light guide plate 134 and may refract and condense light coming from the light guide plate 134 to improve brightness. The prism sheet 140 may convert inclinedly irradiated elements among light irradiated from the light guide plate 134 to be vertically irradiated to the LC panel 100. When light incident to the LC panel 100 is vertically irradiated to the LC panel 100, the light efficiency may be improved.

Figure 2A:
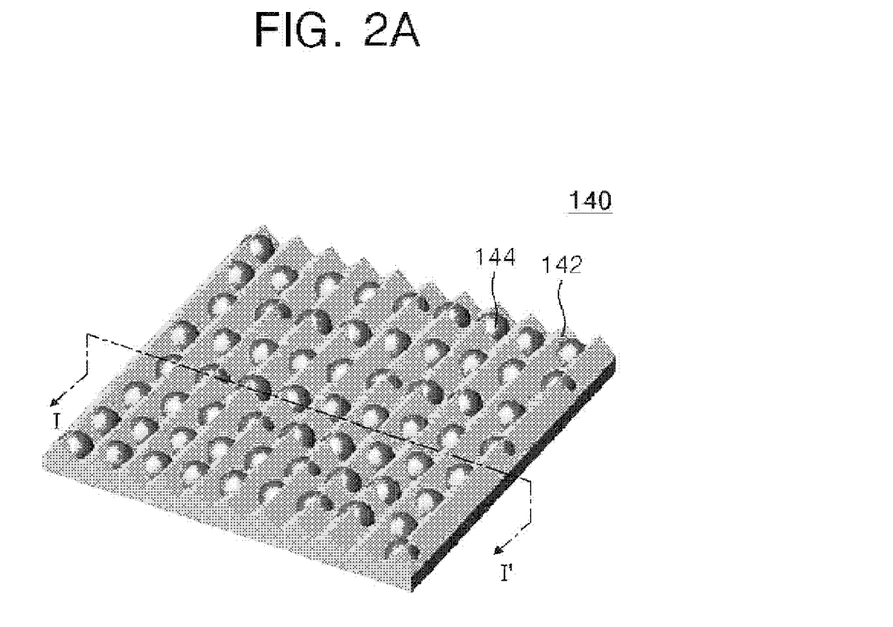
FIG. 2A is a perspective view showing a prism sheet according to a first exemplary embodiment of the present invention.

The inventive LCD device may optionally include the protector sheet 138 above or on the prism sheet 140. The protector sheet 138 may serve to prevent scratches which may occur when the prism sheet 140 directly contacts the LC panel 100 if a prism mountain of a prism pattern (see 142 in FIG. 2) is sharply formed in a vertex form. However, if a prism mountain of the prism pattern 142 is round, there is no need to arrange the protector sheet 138 on the prism sheet 140, which will be described below.

The prism sheet 140 may include a prism pattern and a plurality of irregular diffusion patterns. The pitch of the prism mountain may be in a range of about 20 μm to 200 μm. If the pitch of the prism mountain is less than about 20 μm, a brightness characteristic of light may be degraded. If the pitch of the prism mountain greater than or equal to about 200 μm, a light condensing characteristic may be degraded. For these reasons, it may be advantageous to form the prism mountain with a pitch of about 20 μm to 200 μm. The diffusion pattern may be irregularly dispersed on the prism sheet 140.

Figure 2B:
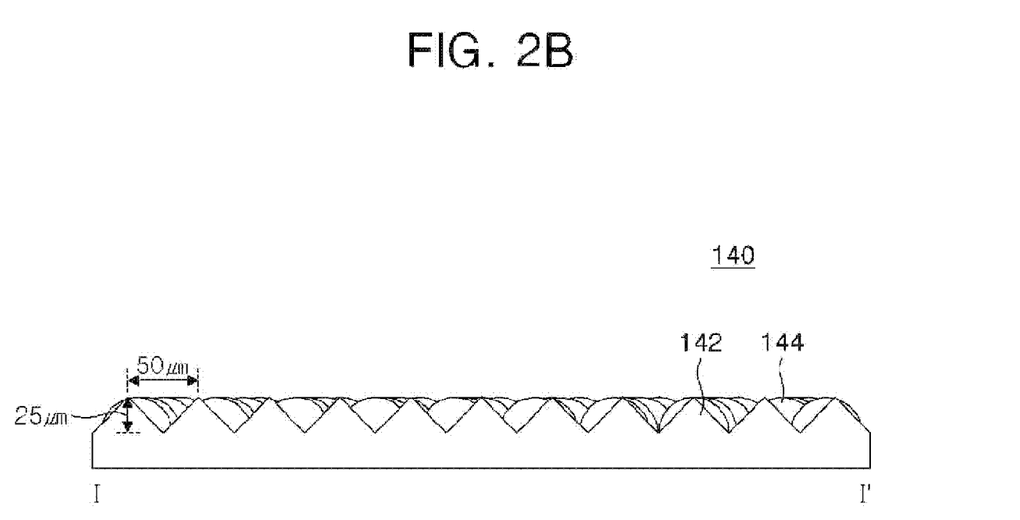
FIG. 2B, FIG. 2C, and FIG. 2D are cross sectional views taken along line I-I' of FIG. 2A.
Figure 2C:
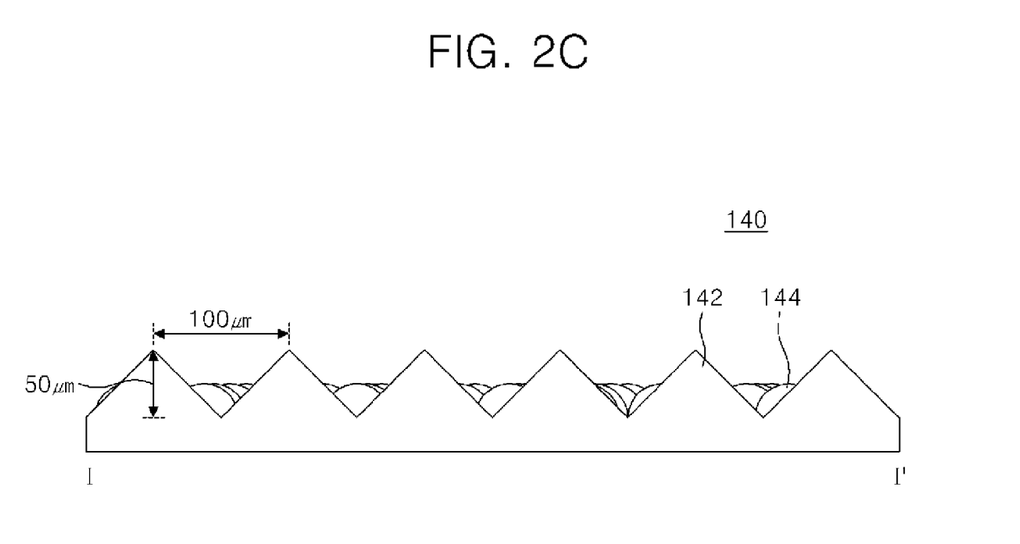
Figure 2D:
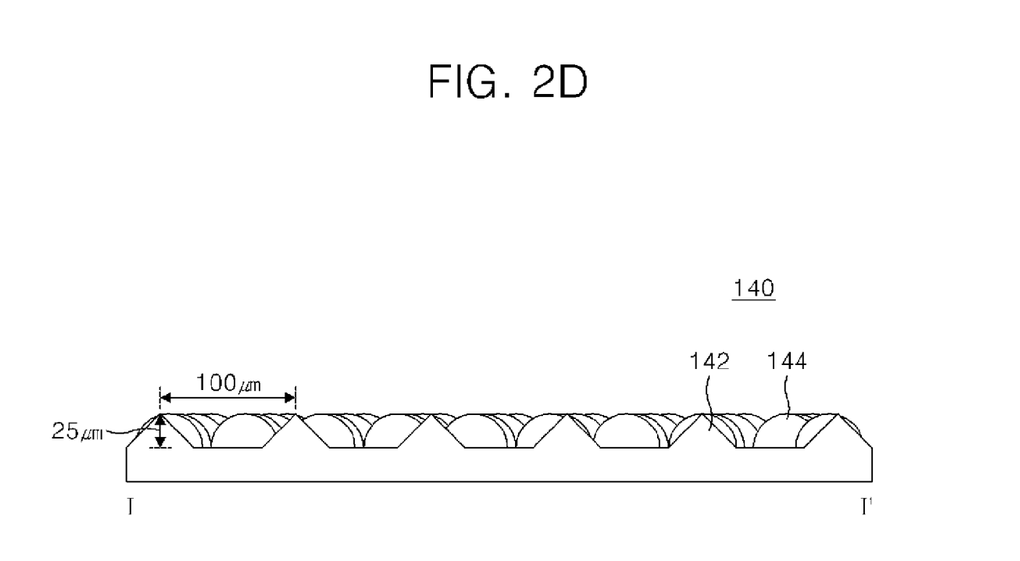

FIG. 2A is a perspective view showing the prism sheet according to a first exemplary embodiment of the present invention, and FIG. 2B, FIG. 2C, and FIG. 2D are cross sectional views taken along line I-I' of FIG. 2A.

Referring to FIG. 2A, FIG. 2B, FIG. 2C, and FIG. 2D, the prism sheet 140 may include a prism pattern 142 having a plurality of mountains and ravines formed in a straight line at regular intervals and a plurality of diffusion patterns 144, which are irregularly formed on the prism pattern 142.

In FIG. 2A and FIG. 2B, the prism mountain is formed with a pitch of about 50 μm, and the prism mountain is formed at a height of about 25 μm. In FIG. 2C, the prism mountain is formed at a pitch of about 100 μm, and the prism mountain is formed at a height of about 50 μm. In FIG. 2D, the prism mountain is formed at a pitch of about 100 μm, and the prism mountain is formed at a height of about 25 μm.

In order to improve a light condensing function of the prism sheet 140, the pitch of the prism mountain should be minimized to increase density. To the contrary, in order to improve the diffusing function of the prism sheet 140, the pitch of the prism mountain should be maximized to reduce density of the prism mountain and increase density of the diffusion pattern 144. FIG. 2A and FIG. 2B show cases where the light condensing characteristic is high, and FIG. 2D show a case where the diffusion characteristic is high. Therefore, it may be possible to adjust the condensing function and the diffusing function according to product characteristics.

Figure 3:
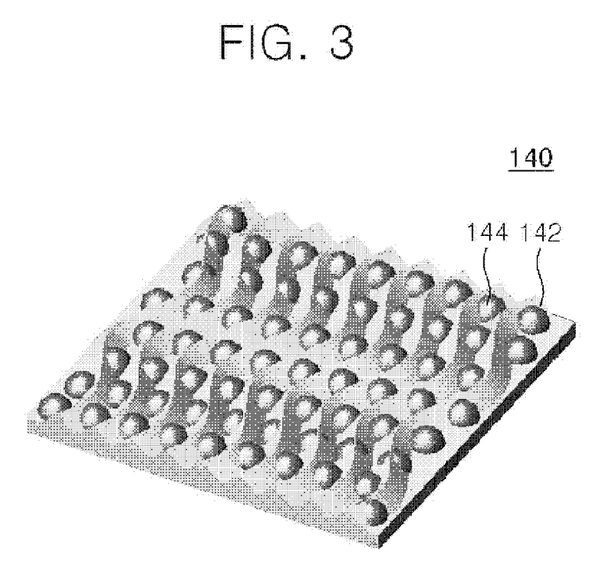
FIG. 3 is a perspective view showing a prism sheet according to a second exemplary embodiment of the present invention.

FIG. 3 is a perspective view showing a prism sheet according to a second exemplary embodiment of the present invention. The prism sheet of FIG. 3 includes a prism pattern 142 having a plurality of mountains and ravines formed in a curved line at regular intervals and a plurality of diffusion patterns 144, which are irregularly formed on the prism patterns 142. The pitch and the height of the prism mountains of the prism pattern 142 may be similar or identical to those described above in the first exemplary embodiment of the present invention, and thus descriptions of those are omitted.

Figure 4:
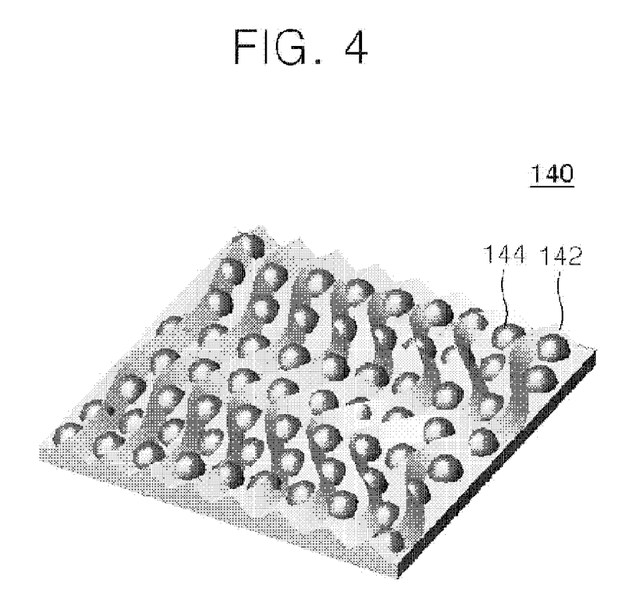
FIG. 4 is a perspective view showing a prism sheet according to a third exemplary embodiment of the present invention.

FIG. 4 is a perspective view showing a prism sheet according to a third exemplary embodiment of the present invention. The prism sheet of FIG. 4 includes a prism pattern 142 having a plurality of mountains and ravines formed in a curved line at irregular intervals and a plurality of diffusion patterns 144, which are irregularly formed on the prism patterns 142. For example, the mountains of the prism pattern 142 may be formed in a curved line at irregular intervals with a pitch of about 20 µm to 70 µm.

When the prism mountains form a curved line, it may be possible to prevent a moiré phenomenon that occurs due to interference between the pixel pitch of the LC panel 100 and the prism mountain pitch of the prism sheet 140.

Figure 5:
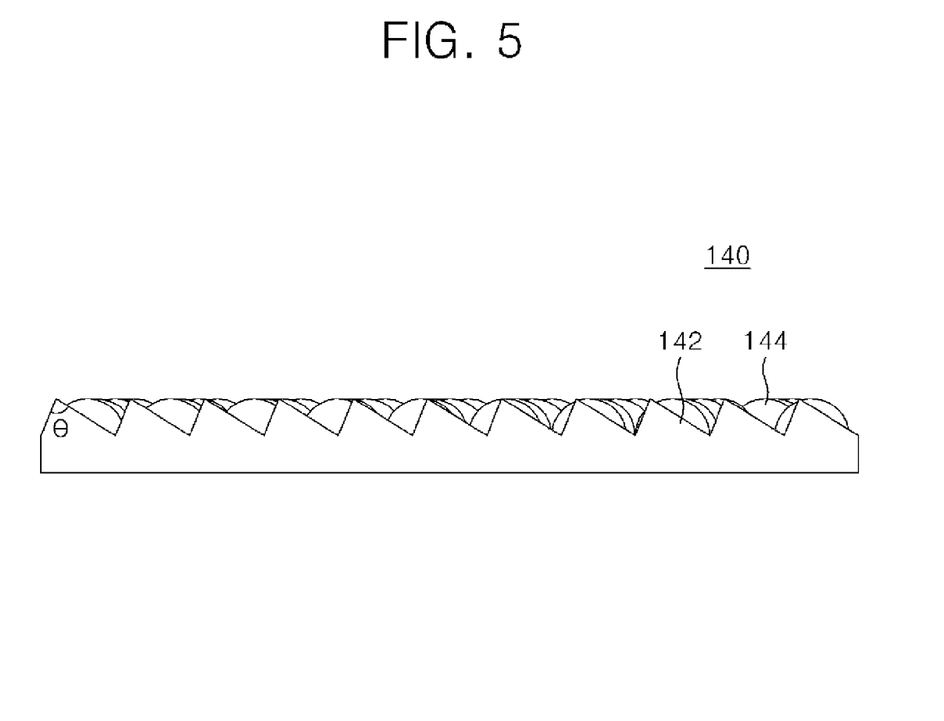
FIG. 5 is a cross-sectional view showing a prism sheet according to a fourth exemplary embodiment of the present invention.

FIG. 5 is a cross-sectional view showing a prism sheet according to a fourth exemplary embodiment of the present invention. The prism sheet 140 of FIG. 5 includes a prism pattern 142 and a plurality of diffusion patterns 144. Each prism mountain of the prism pattern 142 may be formed in a scalene triangle in which two sides are different in length and form an interior angle θ of about 88° to 93°.

Figure 6:
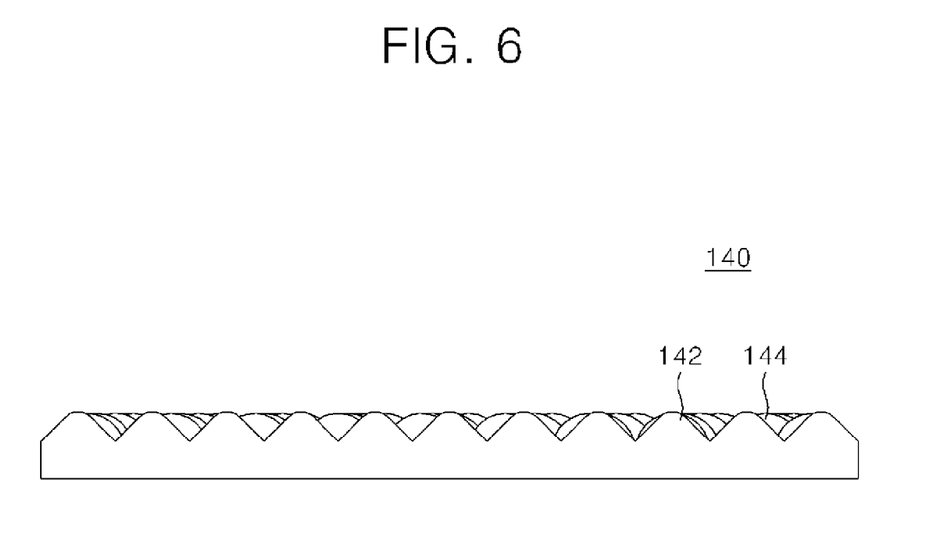
FIG. 6 is a cross-sectional view showing a prism sheet according to a fifth exemplary embodiment of the present invention.

FIG. 6 is a cross-sectional view showing a prism sheet according to a fifth exemplary embodiment of the present invention. The prism sheet 140 of FIG. 6 includes a prism pattern 142 and a plurality of diffusion patterns 144. The vertex or peak of the prism mountain of the prism pattern 142 may be round.

When the vertex of the prism mountain is round, the viewing angle may be improved and a moiré phenomenon may be prevented. Further, friction between the LC panel 100 and the prism mountains may be prevented. As a result, not only may light be condensed and diffused but also, a moiré phenomenon may be prevented using a single prism sheet 140.

The prism sheet 140 of the present invention may be formed using one of the first, second, third, fourth, and fifth embodiments or a combination thereof.

Hereinafter, a method for fabricating the prism sheet 140 according to an exemplary embodiment of the present invention is described. FIG. 7A, FIG. 7B, FIG. 7C, FIG. 7D, FIG. 7E, and FIG. 7F are cross-sectional views showing a first method for fabricating the prism sheet according to an exemplary embodiment of the present invention, and FIG. 8A, FIG. 8B, FIG. 8C, FIG. 8D, FIG. 8E, and FIG. 8F are cross-sectional views showing a second method for fabricating the prism sheet according to an exemplary embodiment of the present invention.

Methods for fabricating the prism sheet 140 according to exemplary embodiments of the present invention include preparing a sub master. The sub master includes a prism pattern in which mountains and ravines are formed in turn and irregular diffusion patterns formed on surfaces of the mountains. A main master including mountains, ravines, and diffusion patterns corresponding to the mountains and ravines and the diffusion patterns of the sub master is formed, and a film is pressurized using the main master to form a prism sheet.

Figure 7A:
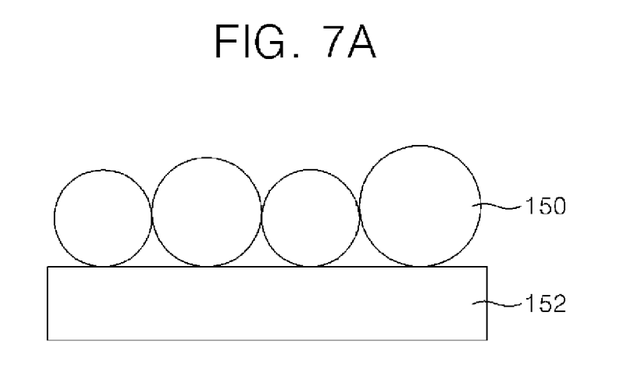
FIG. 7A, FIG. 7B, FIG. 7C, FIG. 7D, FIG. 7E, and FIG. 7F are cross-sectional views showing a first method for fabricating the prism sheet according to an exemplary embodiment of the present invention.
Figure 7B:
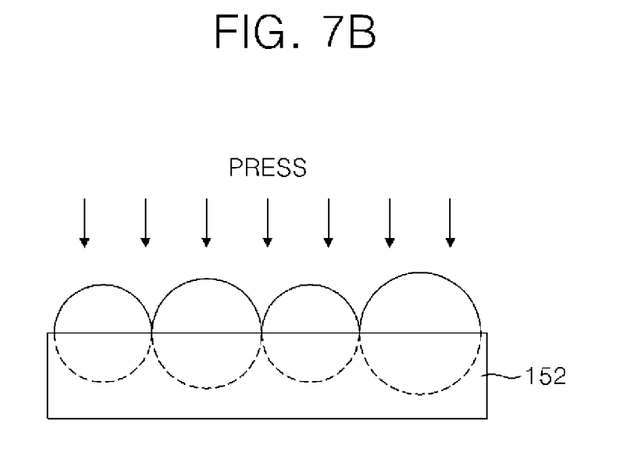
Figure 7C:
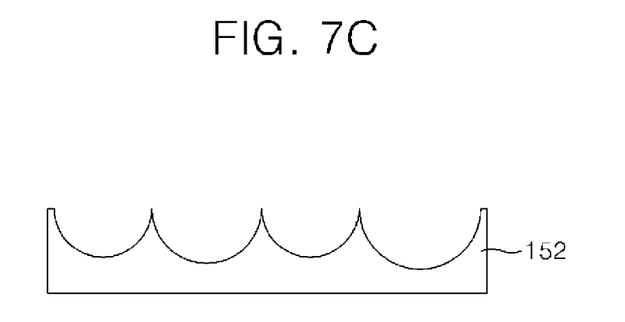

A first method for fabricating the prism sheet according to an exemplary embodiment of the present invention is described with reference to FIG. 7A, FIG. 7B, FIG. 7C, FIG. 7D, FIG. 7E, and FIG. 7F. Referring to FIG. 7A, beads 150 may be irregularly scattered on a substrate 152. The substrate 152 may be made of a soft material, and the beads 150 may be made of acrylic resin, urea resin, or polyurethane. The beads 150 may have at least one of circular, elliptical, and polyhedral shapes. Each bead 150 may have a size of about 10 µm to 12 µm. The beads 150 may be irregularly placed. Referring to FIG. 7B, the beads 150 may be pressurized so that parts of the beads 150 can be inserted into the substrate 152. The beads 150 may be removed and irregular diffusion patterns may be formed in the substrate 152 as shown in FIG. 7C.

Figure 7D:
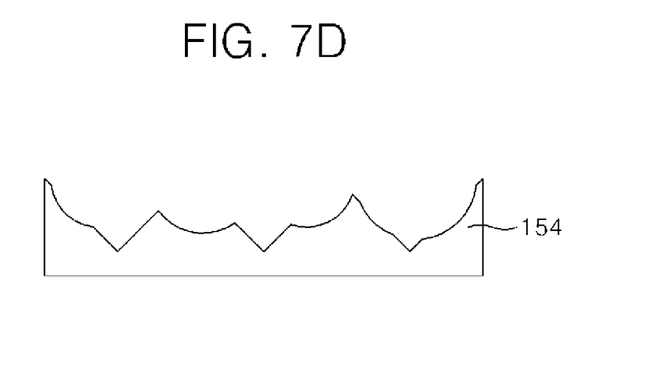
Figure 7E:
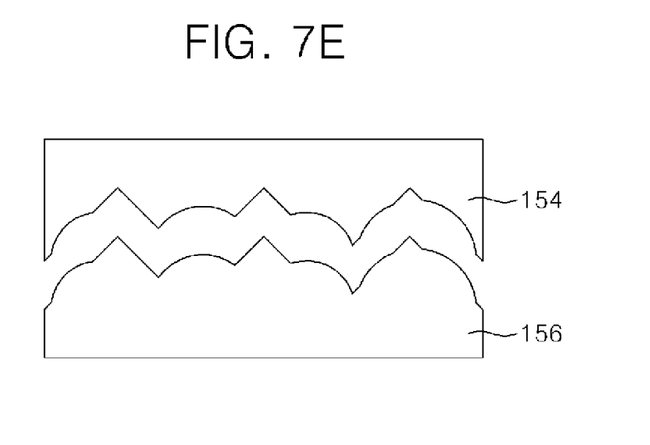
Figure 7F:
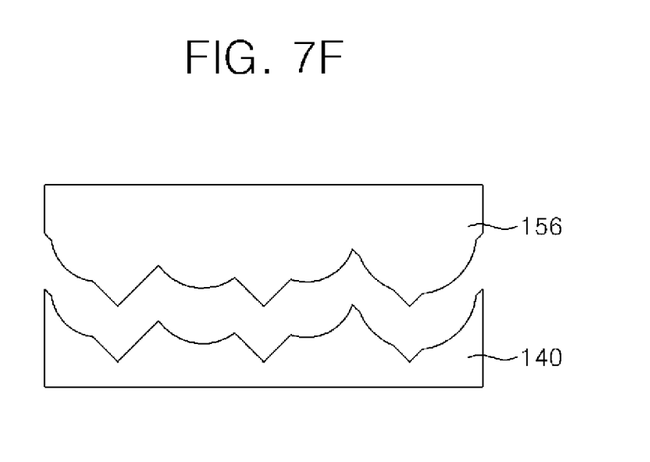

Next, referring to FIG. 7D, a sub master 154 may be prepared by forming a prism pattern in the substrate 152 having the irregular diffusion patterns using a diamond bite. Referring to FIG. 7E, a main master 156 which has mountains, ravines, and irregular diffusion patterns corresponding to the mountains, ravines, and irregular diffusion patterns of the sub master 154 may be prepared using the sub master 154. Finally, referring to FIG. 7F, a film may be pressurized using the main master 156, thereby completing the prism sheet 140.

The prism sheets according to the first, second, third, fourth, and fifth exemplary embodiments of the present invention may be fabricated using the first method for fabricating the prism sheet.

Figure 8A:
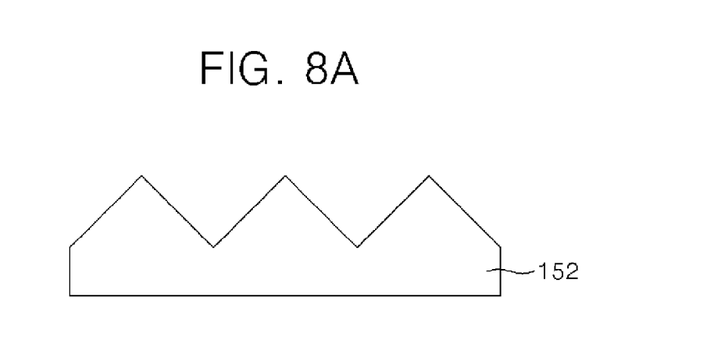
FIG. 8A, FIG. 8B, FIG. 8C, FIG. 8D, FIG. 8E, and FIG. 8F are cross-sectional views showing a second method for fabricating a prism sheet according to an exemplary embodiment of the present invention.
Figure 8B:
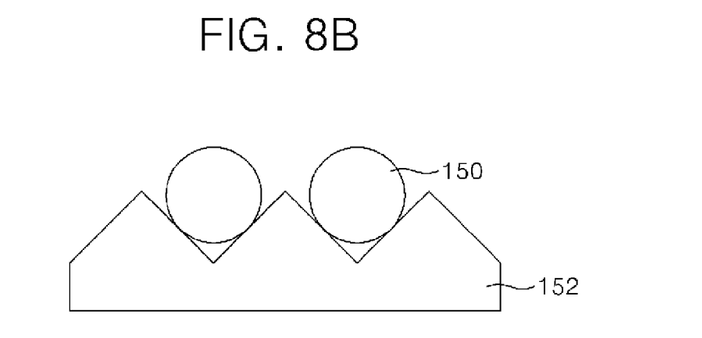
Figure 8C:
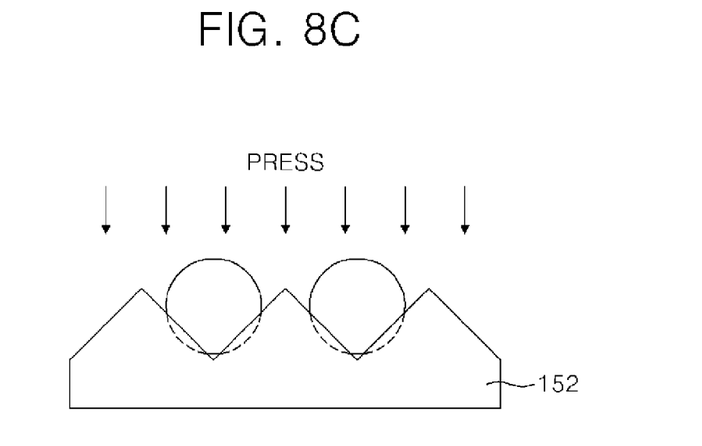

A second method for fabricating the prism sheet according to an exemplary embodiment of the present invention is described with reference to FIG. 8A, FIG. 8B, FIG. 8C, FIG. 8D, FIG. 8E, and FIG. 8F. Referring to FIG. 8A, a prism pattern may be formed in the substrate 152. Then, the beads 150 may be irregularly scattered on the substrate 152 with the prism pattern as shown in FIG. 8B. The beads 150 may be made of acrylic resin, urea resin, or polyurethane. The beads 150 may have at least one of circular, elliptical, and polyhedral shapes. Each bead 150 may have a size of about 10 µm to 12 µm. The beads 150 may be irregularly placed. In FIG. 8C, the beads 150 may be pressurized so that parts of the beads 150 can be inserted into the substrate 152.

Figure 8D:
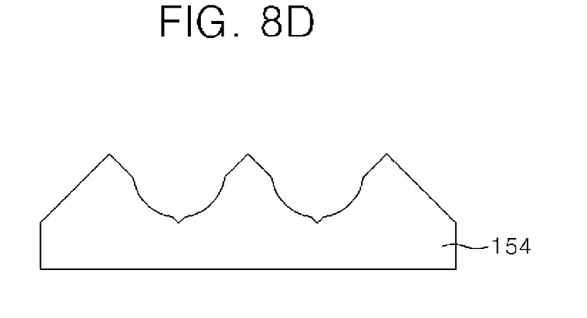

Next, referring to FIG. 8D, the beads 150 may be removed, and the sub master 154 may be prepared by forming irregular diffusion patterns in the substrate 152 with the prism pattern.

Figure 8E:
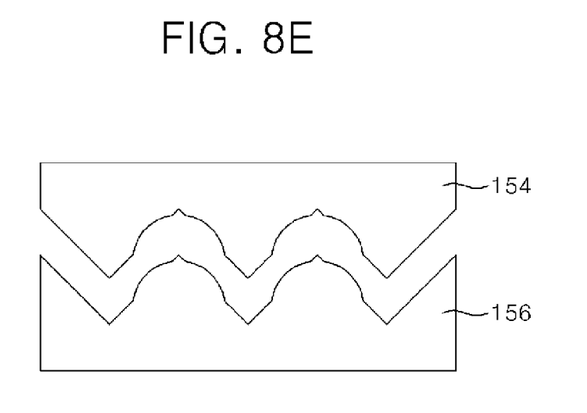
Figure 8F:
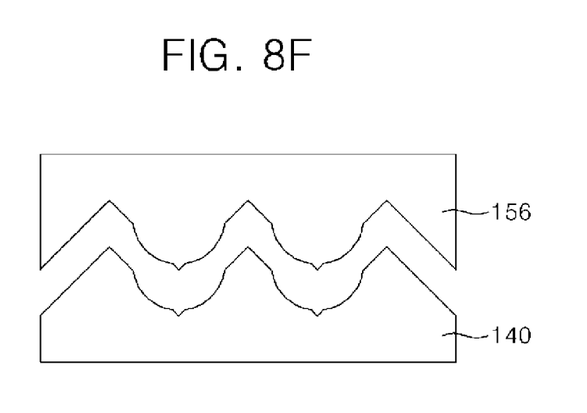

Referring to FIG. 8E, the main master 156 which has mountains, ravines, and irregular diffusion patterns corresponding to the mountains, ravines, and irregular diffusion patterns of the sub master 154 may be prepared using the sub master 154. Finally, referring to FIG. 8F, a film may be pressurized by using the main master 156 to form the prism sheet 140. The prism sheets according to the first, second, third, fourth, and fifth exemplary embodiments of the present invention may be fabricated using the second method for fabricating the prism sheet.

Figure 9A:
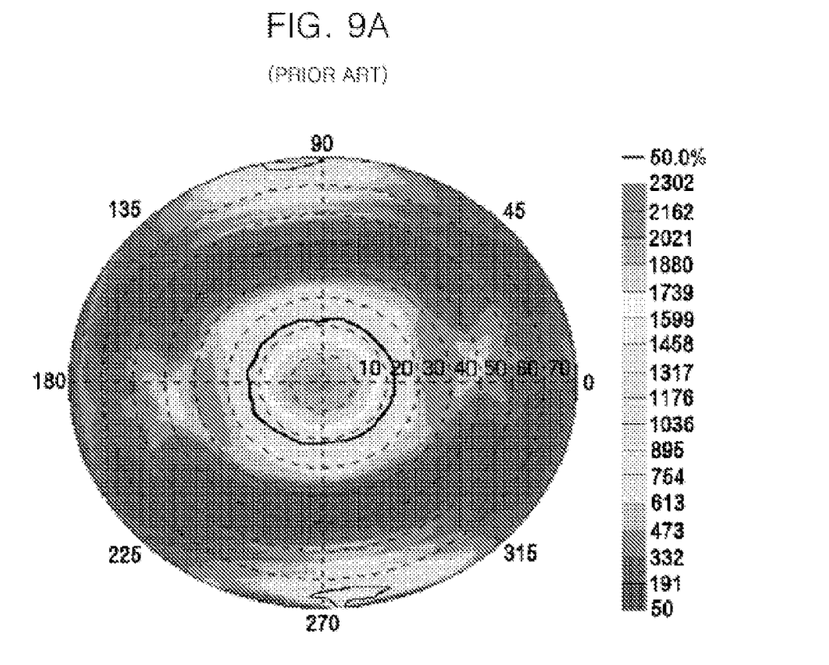
FIG. 9A is a photograph showing a result when the half width of an LCD device with a conventional prism sheet is measured using optical equipment.
Figure 9B:
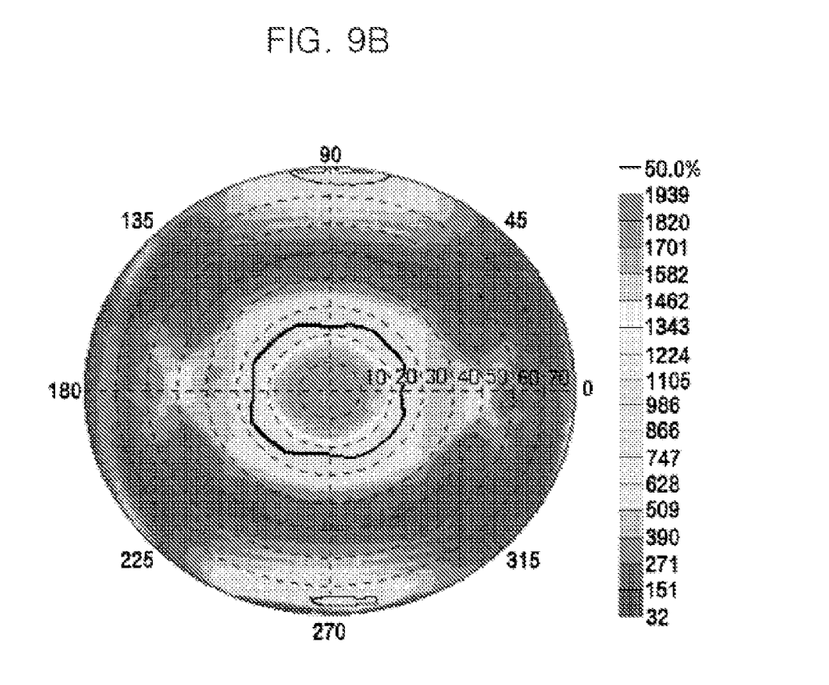
FIG. 9B is a photograph showing a result when the half width of an LCD device with a prism sheet according to an exemplary embodiment of the present invention is measured using optical equipment.

FIG. 9A is a photograph showing a result when the half width of an LCD device with a conventional prism sheet is measured using optical equipment. FIG. 9B is a photograph showing a result when the half width of an LCD device with a prism sheet according to an exemplary embodiment of the present invention is measured using optical equipment.

Referring to FIG. 9A and FIG. 9B, the result of measuring the half width is more than about 15 degrees when a prism sheet according to an exemplary embodiment of the present invention is used, whereas the result of measuring the half width is about 12 degrees when the conventional prism sheet is used. Here, the half width is the angle at which the brightness is reduced by half. The larger the half width is, the greater the brightness. It can be seen in FIG. 9A and FIG. 9B that the brightness may be improved when the prism sheet according to an exemplary embodiment of the present invention is used than when the conventional prism sheet is used.

The prism sheet and the method for fabricating the same according to exemplary embodiments of the present invention have the following advantages. Since the prism pattern and the diffusion patterns may be formed in the prism sheet, the prism sheet may have both diffusing and condensing functions, and thus it may be possible to prevent a moiré phenomenon through a single prism sheet without using a diffusion sheet.

Further, since the diffuser sheet is not needed, the backlight unit may be lightweight, thin, and small. Therefore, the manufacturing process may be simplified and the manufacturing costs may be decreased.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for fabricating an optical sheet, comprising:
preparing a sub master by forming a prism pattern having a plurality of mountains and ravines in turn and having irregular diffusion patterns on sides of the mountains, the mountains being formed in a curved line;
preparing a main master having mountains, ravines, and irregular diffusion patterns corresponding to the mountains, ravines, and irregular diffusion patterns of the sub master; and
pressurizing a film using the main master to form an optical sheet,
wherein the preparing the sub master comprises:
scattering beads irregularly on a substrate, the beads having various sizes;
pressurizing the beads to form the irregular diffusion patterns;
removing the beads from the substrate to expose the formed irregular diffusion patterns on the substrate; and
forming the prism pattern on the irregular diffusion patterns.

2. The method of claim 1, wherein forming the prism pattern comprises forming the mountains at irregular intervals.

3. The method of claim 2, wherein forming the prism pattern comprises forming each mountain with a round peak.

4. A method for fabricating an optical sheet, comprising:
preparing a sub master by forming a prism pattern having a plurality of mountains and ravines in turn and forming irregular diffusion patterns on sides of the mountains, the mountains being formed in a curved line;
preparing a main master, the main master having mountains, ravines, and irregular diffusion patterns corresponding to the mountains, ravines, and irregular diffusion patterns of the sub master; and
pressurizing a film using the main master to form an optical sheet,
wherein the preparing the sub master comprises:
forming the prism pattern on a substrate;
scattering irregularly beads on the substrate, the beads having various sizes;
pressurizing the beads to form the irregular diffusion patterns; and
removing the beads from the substrate to expose the formed irregular diffusion patterns on the prism pattern.

5. The method of claim 4, wherein forming the prism pattern comprises forming the mountains at irregular intervals.

6. The method of claim 5, wherein forming the prism pattern comprises forming each mountain with a round peak.

7. The method of claim 1, wherein the beads comprise diameters in a range of 10 μm to 12 μm.

8. The method of claim 7, wherein pressurizing the beads comprises pressing down on the beads so that parts of the beads are inserted into the substrate.

9. The method of claim 1, wherein pressurizing the beads comprises pressing down on the beads so that parts of the beads are inserted into the substrate.

10. The method of claim 4, wherein the beads comprise diameters in a range of 10 μm to 12 μm.

11. The method of claim 10, wherein pressurizing the beads comprises pressing down on the beads so that parts of the beads are inserted into the substrate.

12. The method of claim 4, wherein pressurizing the beads comprises pressing down on the beads so that parts of the beads are inserted into the substrate.

* * * * *